Jan. 19, 1971     W. G. BURGE     3,555,936
CHIP BREAKERS
Filed May 21, 1969
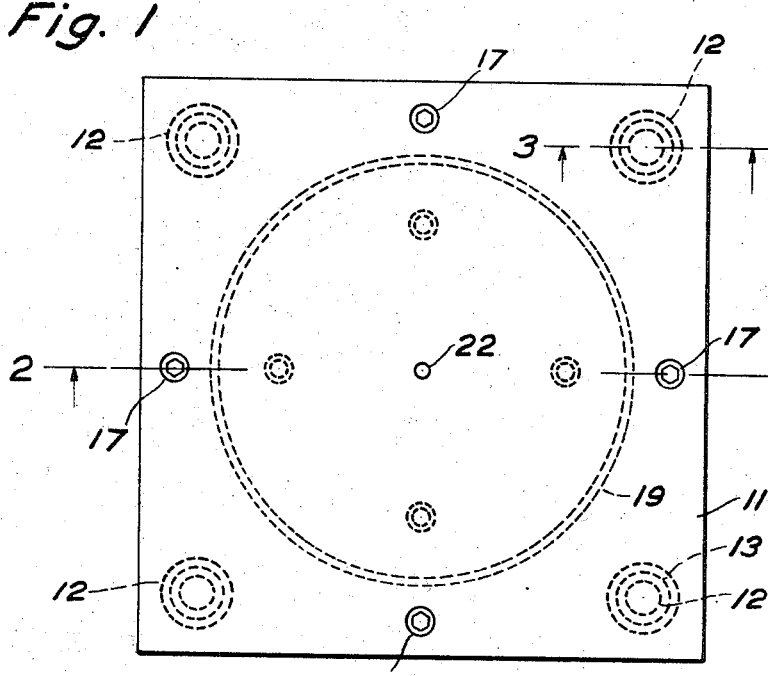
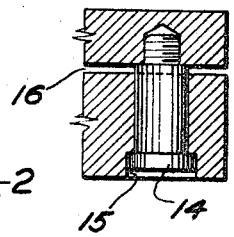
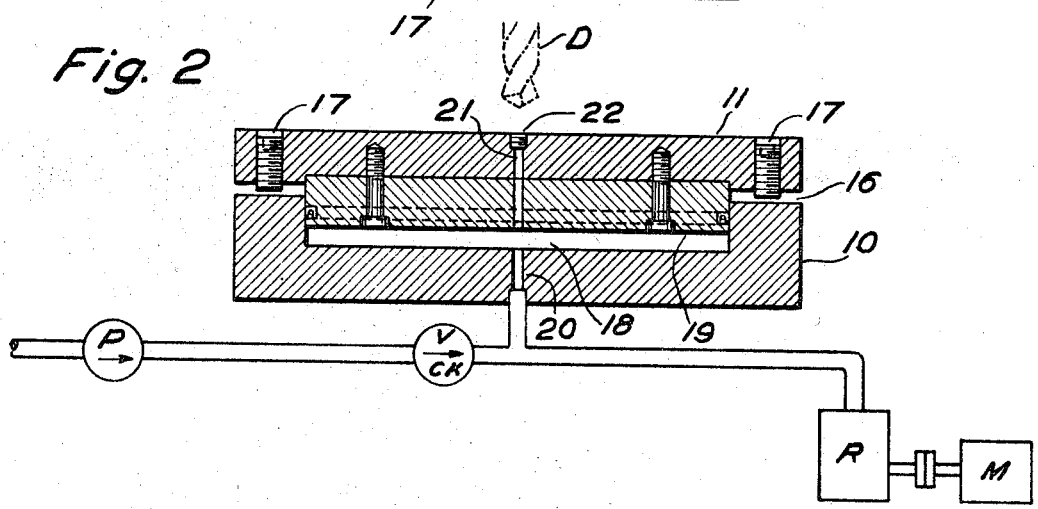
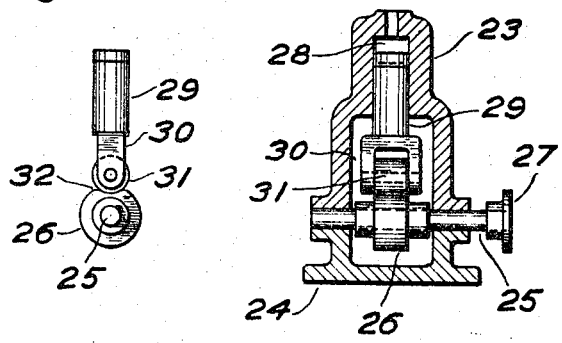
William G. Burge
INVENTOR.
BY John Walker
AGENT 3,555,936
CHIP BREAKERS
William G. Burge, 955 Seven Hill Ranch Road,
Walnut Creek, Calif. 94598
Filed May 21, 1969, Ser. No. 826,391
Int. Cl. B23b 47/34
U.S. Cl. 77—63                                4 Claims

ABSTRACT OF THE DISCLOSURE

A chip breaker for drilling operations wherein the contact between the drill and the work piece is maintained by a sub-base and a superimposed table which are held slightly apart by hydraulic pressure. Intermittent release of the pressure allows the base and the table to come together, thereby momentarily interrupting the cutting action of the drill and breaking the chip.

---

This invention relates to chip breakers, and more particularly to a means of automatically breaking the cuttings normally produced during metal drilling operations.

In the machine tool working trades, it is well known that the drilling of various metals, such as steel and certain types of bronze, results in the forming of cuttings which, under certain conditions, can present quite a problem. The term chip, as applied to these cuttings, is somewhat of a misnomer, as material removed by drilling operations is formed into a pair of ribbons of a width and thickness determined by the drill size and feed respectively. These ribbons are, by the action of the flutes of the drill, formed or curled into a helix, which, with a constant and uninterrupted drill feed, can attain a length of several feet.

In normal job shop operations, the drilling of one hole at a time is more or less standard procedure, and the cuttings present no difficulty, as the machine operator is able to easily cope with the situation. However, in the case of production work, where a large number of holes are being drilled simultaneously, and often quite close together, this multiforming of cuttings can present quite a problem. They become entangled with one another, and quickly make it necessary to discontinue operation of the machine until their removal is effected.

It is the principal object of the present invention to provide a means of limiting the length of the cuttings formed during drilling operations, to a degree which will enable them to be handled without stoppage of the operation.

It is a further object of the invention to provide a chip breaker that can be adjusted to suit various speeds and feeds of drilling operations.

Another object of the invention is the provision of a device as described which is applicable to any type of machine tool on which drilling operations are performed, regardless of whether the drilling is done vertically, horizontally, or at an angle, and is equally effective whether applied to "set ups" involving fixed work pieces and rotating drills, or revolving work pieces and fixed drills.

A still further object of the invention is the provision of a chip breaker which can be designed as an integral component of a machine tool, or which can be manufactured as an auxiliary thereto.

These and other objects of the invention will become apparent during the course of the following description and appended claims, taken in connection with the accompanying drawing forming a part hereof, and in which:

FIG. 1 is a plan view of a simple embodiment of my invention.

FIG. 2 is a transverse, vertical section of the device shown on FIG. 1, as viewed from line 2—2 thereon, with an associated hydraulic system diagrammatically illustrated.

FIG. 3 is a fragmentary cross section taken on line 3—3 of FIG. 1.

FIG. 4 is a vertical transverse section of a typical type of ram, forming part of the hydraulic system.

FIG. 5 is an end view of a cam and shaft forming part of the unit shown on FIG. 4, and further illustrating the ram in its operating position with reference to the cam.

Referring to the drawing in detail, the device comprises a base 10, having a work receiving table 11, superimposed thereon, and being in vertical, axial alignment therewith. Alignment between the base and the table is ensured by a plurality of guide members, or pins, 12, which, after passing slidably through apertures 13, in the base 10, are firmly secured into the underside of the table 11 as illustrated. The pins 12 are formed with heads 14 which, engaging shoulders formed by counterbores 15 of the apertures 13, secure the base and the table tagether, while allowing for a limited axial movement between these two elements. Installation of the pins 12 from the underside of the assembly is preferred as it will preclude contact with chips or other material, which may adversely affect free movement between the parts.

Movement between the base 10 and the table 11 is adjustable from zero up to a maximum set by the width of the space 16 between them. Such adjustment is accomplished by equal advancement or retraction of adjusting screws 17, passing through the table as indicated.

A circular recess 18, formed in the upper side of the base 10, is adapted to form a cylinder for the reception of a piston 19, which in turn, is securely attached to the underside of the table 11. This piston will, of course, be provided with suitable sealing means. A port 20 communicates with the cylinder 18, the location of which will be determined by the particular application of the chip breaker as a whole. The unit formed by the assembly of the table 11 and the piston 19, is provided with a vent 21, and plug 22 in order that all air can be exhausted from the cylinder 19 and other parts of the hydraulic system.

The hydraulic system for operation of the chip breaker consists of a pump P, a check valve V, a fluid displacement ram R, a drive unit M, operably coupled to the ram unit, and the connecting pipe, as diagrammatically illustrated on FIG. 2. The unit M will be of a conventional design, which will provide for both intermittent motion of the ram R, and timed sequences of such motion.

Referring to FIGS. 4 and 5, which illustrate the details of the displacement ram R, it will be seen that a split housing comprising upper and lower sections 23 and 24 respectively, has a shaft 25 journalled therein. A cam 26 is fixedly mounted on the shaft 25, and is of course, driven thereby, a coupling 27 being provided for connection to the drive unit M. The upper portion 23 of the housing, encloses a cylinder 28 adapted to receive a plunger or ram 29. This plunger is provided, at the lower end thereof, with a clevis 30 and a roller 31. The roller, being in alignment and contact with the cam 26, intermittent, reciprocal motion of the ram 29 will take place upon rotation of the shaft 25. The retractile dwell surface 32 of the cam 26 is preferably of small angular extent, in order that the up and down movement of the ram is of a sudden nature and of a limited duration.

In operation, the system will be connected to a source of hydraulic fluid, the cylinder will be vented of all air, and pumped to a pressure determined by the load on the table and the drill pressure exerted on the work piece. Upon reaching the desired pressure, the fluid will be retained in the base cylinder, the ram cylinder and the connecting pipes to form a closed system. The check valve will prevent the pump from being subjected to any back pressure. The movement of the table will be adjusted to the thickness of the chips being formed during the drilling operation. This of course, will be determined by the feed of the drill or drills. The time cycle of the ram operation will be set to ensure a predetermined maximum length of chip material being formed. This will be established by the speed and feed of the drills being used.

When the drill D is brought into engagement with the work piece, and the drilling operation is commenced, it will proceed in the usual fashion until the cam and the ram roller assume the relative positions as shown on FIG. 5. The pressure acting upon the table piston will then be relieved, allowing the table and the work piece to fall away from the drill a sufficient distance to interrupt the cutting action and terminate the forming of the chips for a brief period of time. Continued rotation of the cam will almost instantly restore the cutting relationship of drill and work, and the operation will then proceed in the usual manner until the cycle is repeated. Chips formed during this operation can be readily removed without loss of time, as the stopping of the machine for this purpose will no longer be necessary.

From the foregoing it will be apparent that I have provided a means of positively eliminating a malcondition now incidental to drilling operations. The inconvenience of removing and disposing of large bulks of tangled cuttings will be eliminated. Removal of cuttings produced by machinery equipped with my chip breaker can be effected without interference with the continued operation of the machine.

While I have illustrated and described a preferred embodiment of my device, it should be understood that no limitation is intended thereby as modifications may be made within the spirit and scope of the appended claims.

I claim:
1. A chip breaker comprising a base having a circular recess adapted to form a cylinder in one side thereof, a table in confronting relationship with said base, a piston being mounted on one side of said table and being adapted to engagement with the recess of said base, guide means adapted to maintain alignment between said base and said table, and being further adapted to permit limited separable movement therebetween; hydraulic means communicating with the circular recess of said base and being adapted to maintain said base and said table in separated positions, and means adapted to intermittently release the pressure of said hydraulic means allowing the said base and said table to approach one another.

2. A chip breaker as in claim 1 wherein the movement between said base and said table is adjustable.

3. A chip breaker as in claim 1 wherein the frequency of the hydraulic pressure release means is adjustable.

4. A chip breaker as in claim 3 wherein the movement between said base and said table is adjustable.

References Cited

UNITED STATES PATENTS 2,453,136  11/1948  Karweit _____ 77—5

FOREIGN PATENTS 1,071,246  6/1967  Great Britain _____ 77—5

FRANCIS S. HUSAR, Primary Examiner

U.S. Cl. X.R.

77—5